(12) United States Patent
Liu et al.

(10) Patent No.: US 12,200,700 B2
(45) Date of Patent: Jan. 14, 2025

(54) TIME DOMAIN RESOURCE ALLOCATION

(71) Applicant: LENOVO (BEIJING) LIMITED, Beijing (CN)

(72) Inventors: Hongmei Liu, Beijing (CN); Haipeng Lei, Beijing (CN); Zhennian Sun, Beijing (CN); Zhi Yan, Beijing (CN); Lianhai Wu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 632 days.

(21) Appl. No.: 17/275,697

(22) PCT Filed: Sep. 19, 2018

(86) PCT No.: PCT/CN2018/106412
§ 371 (c)(1),
(2) Date: Mar. 12, 2021

(87) PCT Pub. No.: WO2020/056615
PCT Pub. Date: Mar. 26, 2020

(65) Prior Publication Data
US 2022/0030574 A1    Jan. 27, 2022

(51) Int. Cl.
*H04W 72/04* (2023.01)
*H04L 5/00* (2006.01)
(Continued)

(52) U.S. Cl.
CPC ........... *H04W 72/20* (2023.01); *H04L 5/0053* (2013.01); *H04W 28/26* (2013.01); *H04W 72/0446* (2013.01)

(58) Field of Classification Search
None
See application file for complete search history.

(56) References Cited

U.S. PATENT DOCUMENTS

| 2012/0300616 A1* | 11/2012 | Zeng | H04W 72/23 370/216 |
| 2013/0010685 A1* | 1/2013 | Kim | H04W 72/23 370/315 |

(Continued)

FOREIGN PATENT DOCUMENTS

| CN | 107734665 A | 2/2018 |
| CN | 108419297 A | 8/2018 |

(Continued)

OTHER PUBLICATIONS

3GPP, 3rd Generation Partnership Project; Technical Specification Group Radio Access Network; Contents of group-common PDCCH, 3GPP R1-1710793, Jun. 2017, pp. 1-4.

(Continued)

*Primary Examiner* — Eunsook Choi
(74) *Attorney, Agent, or Firm* — Kunzler Bean & Adamson

(57) ABSTRACT

Methods and apparatuses for time domain resource allocation are disclosed. A method comprises: receiving a first slot format indicating a first time domain resource; receiving an indicator indicating a second time domain resource allocated for data or control channel transmission; mapping the second time domain resource to a third time domain resource, wherein the third time domain resource is a subset of the first time domain resource; and receiving the data or control channel transmission from the third time domain resource. Although the method may imply that the first slot format is received before the indicator is received, the indicator may be received before the first slot format is received.

20 Claims, 8 Drawing Sheets

(51) Int. Cl.
*H04W 28/26* (2009.01)
*H04W 72/20* (2023.01)
H04W 72/0446 (2023.01)

(56) References Cited

U.S. PATENT DOCUMENTS

| | | | |
|---|---|---|---|
| 2013/0064099 A1* | 3/2013 | Kim | H04L 27/2602 |
| | | | 370/241 |
| 2014/0334392 A1 | 11/2014 | Gage et al. | |
| 2016/0105882 A1* | 4/2016 | Park | H04B 7/024 |
| | | | 370/329 |
| 2016/0119947 A1* | 4/2016 | Park | H04L 5/0035 |
| | | | 370/329 |
| 2017/0332359 A1 | 11/2017 | Tsai et al. | |

FOREIGN PATENT DOCUMENTS

| | | |
|---|---|---|
| EP | 2671341 B1 | 10/2017 |
| WO | 2013174205 A1 | 11/2013 |

OTHER PUBLICATIONS

International Searching Authority, "Notification of Transmittal of the International Search Report and the Written Opinion of the International Searching Authority, or the Declaration", PCT/CN2018/106412, Sep. 19, 2018, pp. 1-6.

* cited by examiner

TIME DOMAIN RESOURCE ALLOCATION

FIELD

The subject matter disclosed herein generally relates to wireless communications and, more particularly, to time domain resource allocation.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCID), Light Emitting Diode (LED), Organic LED (OLED), Multiple-Input Multiple-Output (MIMO), Sounding Reference Signal (SRS), Code division multiplexing (CDM), Physical Resource Block (PRB), Integrated Access and Backhaul (IAB), Time division multiplexing (TDM), Physical Downlink Shared Channel (PDSCH), Physical Uplink Shared Channel (PUSCH), Physical Downlink Control Channel (PDCCH), Physical Uplink Control Channel (PUCCH).

FIG. 1 shows a two-hop IAB (Integrated Access and Backhaul) system. FIG. 1 shows three types of nodes: parent node, child node and served UE. The link between the parent node and the child node is referred to as backhaul link. The link between the child node and its served UE is referred to as access link. Technically, the served UE shown in FIG. 1 may also be a child node that serves another UE.

An IAB node is a kind of gNB which can perform both gNB and UE function. When it is started, it will behave like a UE to do cell search and find suitable cell to associate with. After it is connected to the network, it can behave like a gNB to serve UEs by transmitting system broadcast information and scheduling UEs. Both the parent node and the child node in FIG. 1 can be considered as an IAB node.

A half duplex restriction at a node means that a node cannot perform transmission and reception simultaneously. Since there a half duplex restriction at the IAB node, resource partitioning between an access link and a backhaul link is necessary. In this case, some of the time domain resources are allocated only for supporting the backhaul link and others are allocated only for supporting the access link. This configuration is referred to as TDM-based resource partitioning between the access link and the backhaul link. In the JAB system shown in FIG. 1, a parent node determines TDM resource partitioning between the backhaul link and the access link. The parent node may allocate some resources for DL and UL transmissions for a backhaul link, and reserve certain other resources for its child node, i.e., the resources for the access link between the child node and its served UE.

FIG. 2 shows an example of a slot format indicated by the parent node for the backhaul link and a slot format indicated by the child node for the access link based on TDM scheme. As shown in FIG. 2, a single slot has 14 symbols (symbol 0 to symbol 13). A slot shown in the upper part of FIG. 2, identifies a parent node allocation where first four symbols (each indicated with letter "D") are allocated for the DL transmission on the backhaul link, and the last two symbols (each indicated with letter "U") are allocated for the UL transmission on the backhaul link. In addition, middle eight symbols (each indicated with a letter "F") are reserved for the child node to use for the access link between the child node and its served UE. As shown in the lower part of FIG. 2, as the first four symbols and the last two symbols are allocated by the parent node for use for the backhaul link, the child node indicates these six symbols as reserved (each indicated with letter "F"), i.e., not used to support communication over the access link. Among the middle eight symbols, the child node allocates the first four symbols for the DL transmission for the access link (each indicated as an "D"), allocates the last two symbols for the UL transmission for the access link (each indicated as an "U"). In addition, the middle two symbols won't be used by the child node for the access link, so they are also indicated as reserved. In in a situation where a served UE also function as a second child node serving a second UL the reserved symbols (including 4 symbols in the beginning, 2 symbols in the middle and 2 symbols in the end) may be allocated by this served UE (i.e., the second child node) to be used for the link between itself and the second U E.

However, this mechanism may cause some problems for transmissions via data channels (i.e. PDSCH and PUSCH) and control channels (PDCCH and PUCCH).

For example, since transmission of the DL resources (on PDSCH) and UL resources (on PUSCH) is fragmented, each fragmented resource has to be scheduled by an individual PDCCH. For example, when referring to FIG. 3, a PDCCH (DL grant) is used to schedule symbols 3-6 of slot 0, and another PDCCH (DL grant) is used to schedule symbols 4-9 of slot 1. Hence, two PDCCHs are necessary to schedule transmission of DL symbols in slot 0 and slot 1, with the total scheduled DL symbols in both slots being 10 symbols, which leads to large control signaling overhead. Similarly, the UE has to be configured with too many PDCCH monitoring occasions. This would lead to high blind detection effort, high power consumption and large control channel overhead.

Another problem may be caused by the mismatch between the preconfigured control channel (i.e., PDCCH and PUCCH) resource and the slot format indicated by DCI format 2_0. In NR, the time domain resource for PDCCH and PUCCH is semi-statically configured by RRC signaling. On the other hand, the slot format information is carried by DCI format 2_0. For example, as shown in the upper sequence of slots in FIG. 3, the first two symbols (symbol 0 and symbol 1) of slot 1 are preconfigured by RRC signaling as the resources for the PDCCH transmission between the child node and the UE. On the other hand, the slot format indicated in the DCI format 2_0 transmitted from the child node may reserve the resources including the first two symbols of the slot 1 for use over the backhaul link. That is to say, the first two symbols of the slot 1 cannot be used for the access link between a child node and the UE. In this condition, the PDCCH transmission between the child node and the UI preconfigured by the RRC signaling in the first two symbols of the slot 1 has to be abandoned.

BRIEF SUMMARY

Methods and apparatuses for time domain resource allocation are disclosed.

In one embodiment, a method comprises: receiving a first slot format indicating a first time domain resource; receiving an indicator indicating a second time domain resource allocated for data or control channel transmission; mapping the second time domain resource to a third time domain resource, wherein the third time domain resource is a subset of the first time domain resource; and receiving the data or control channel transmission from the third time domain resource. Although the method may imply that the first slot format is received before the indicator is received, the indicator may be received before the first slot format is received.

In some embodiment, the method further comprises determining a mapping boundary for mapping. In one embodiment, the mapping boundary includes a starting position and an ending position, and the starting position and the ending position are aligned with a physical slot boundary, respectively. In another embodiment, the mapping boundary includes a starting position and an ending position, and the starting position and the ending position are determined based on the monitoring occasion and periodicity for receiving the first slot format. In yet another embodiment, the mapping boundary includes a starting position and an ending position, and the starting position and the ending position are determined based on starting and ending of consecutive available time domain resources.

In some embodiment, the indicator indicating the second time domain resource for the data channel transmission is a second slot format including consecutive DL symbols and UL symbols without reserved symbols intervened. In one embodiment, the DL symbols and the UL symbols are interlaced. In another embodiment, the DL symbols the UL symbols are continuous, respectively. In yet another embodiment, in the first slot format, DL symbols and UL symbols are non-consecutive, respectively, and the mapping comprises mapping the consecutive symbols in the second slot format to the non-consecutive symbols in the first slot format. Optionally, the first slot format further includes reserved symbols.

In some embodiment, the first slot format includes unavailable symbols and available symbols for control channel transmission, and the mapping comprises mapping the unavailable symbols to the available symbols circularly.

In some embodiment, a method comprises: transmitting a first slot format indicating a first time domain resource; mapping a third time domain resource for data channel transmission to a second time domain resource, wherein the third time domain resource is a subset of the first time domain resource; transmitting an indicator indicating the second time domain resource; and transmitting the data channel on the third time domain resource.

In some embodiment, a method comprises: transmitting a first slot format indicating a first time domain resource; transmitting an indicator indicating a second time domain resource allocated for control channel transmission; mapping the second time domain resource to a third time domain resource, wherein the third time domain resource is a subset of the first time domain resource; and transmitting the control channel transmission on the third time domain resource.

In some embodiment, a remote unit comprises: a receiver that receives a first slot format indicating a first time domain resource, and an indicator indicating a second time domain resource allocated for data or control channel transmission; and a processor that maps the second time domain resource to a third time domain resource, wherein the third time domain resource is a subset of the first time domain resource, wherein the receiver receives the data or control channel transmission from the third time domain resource.

In some embodiment, a base unit comprises: a transmitter that transmits a first slot format indicating a first time domain resource; and a processor that maps a third time domain resource for data channel transmission to a second time domain resource, wherein the third time domain resource is a subset of the first time domain resource; wherein the transmitter transmits an indicator indicating the second time domain resource, and transmits the data channel on the third time domain resource.

In some embodiment, a base unit comprises: a transmitter that transmits a first slot format indicating a first time domain resource, and an indicator indicating a second time domain resource allocated for control channel transmission; and a processor that maps the second time domain resource to a third time domain resource, wherein the third time domain resource is a subset of the first time domain resource, wherein the transmitter transmits the control channel transmission on the third time domain resource.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
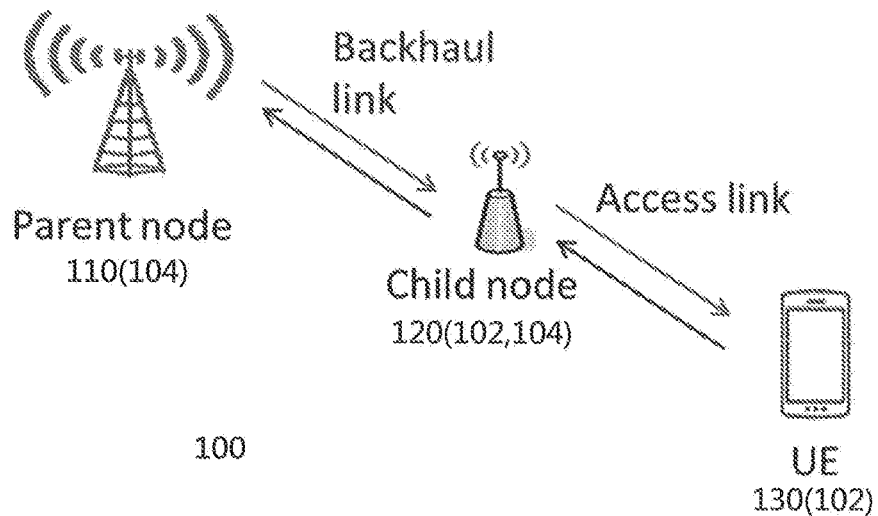
FIG. 1 is a schematic block diagram illustrating one embodiment of an IAB system.
Figure 2:
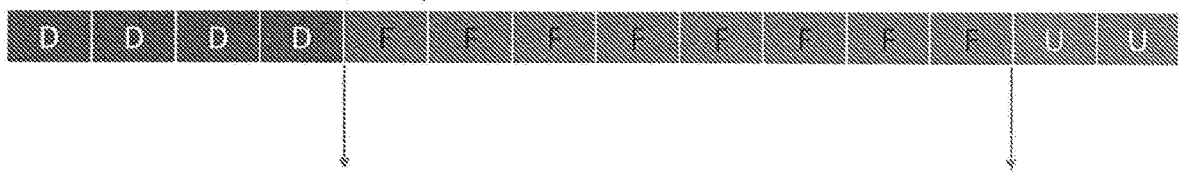
FIG. 2 is a schematic block diagram illustrating slot format indications for the backhaul link and the access link based on TDM.
Figure 2:
Figure 3:
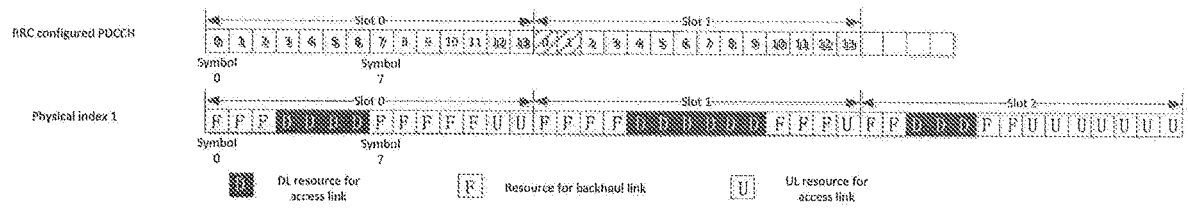
FIG. 3 is a schematic block diagram illustrating mismatch between preconfigured control channel monitoring occasion and the slot format indicated by DCI format 2_0.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions or acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function or act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions or acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for time domain resource allocation. In one embodiment, the wireless communication system 100 includes parent nodes 110, child nodes 120 and UEs 130. Even though only one parent node 110, one child node 120 and one UE 130 are depicted in FIG. 1, one skilled in the art will recognize that any number of parent nodes 110, child nodes 120 and UEs 130 may be included in the wireless communication system 100.

In the backhaul link between the parent node 110 and the child node 120, the parent node functions as a base unit 104 while the child node functions as a remote unit 102. In the access link between the child node 120 and the UE 130, the child node functions as a base unit 104 while the UE functions as a remote unit 102. For any link between a base unit 104 and a remote unit 102, the base unit 104 would be responsible to control the communication between the base unit 104 and the remote unit 102.

In one embodiment, the remote units 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, user equipment (UE), user terminals, a device, or by other terminology used in the art.

The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with NR (5G). More generally, however, the wireless communication system 100 may implement some other open or proprietary communication protocol.

The base units 104 may serve a number of remote units 102 within a serving area. The base units 104 transmit DL communication signals to serve the remote units 102 in the time, frequency, and/or spatial domain.

Figure 4:
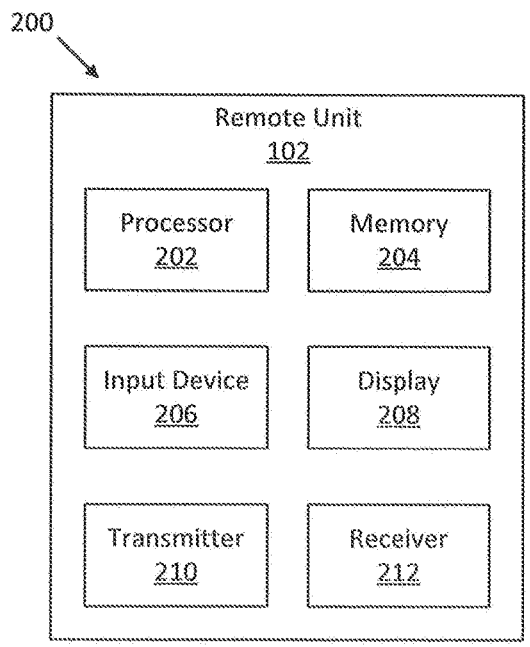
FIG. 4 is a schematic block diagram illustrating one embodiment of an apparatus that may be used for time domain resource allocation.

FIG. 4 depicts one embodiment of an apparatus 200 that may be used for time domain resource allocation. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes is non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. Although only one transmitter 210 and one receiver 212 are illustrated, the remote unit 102 may have any suitable number of transmitters 210 and receivers 212. The transmitter 210 and the is receiver 212 may be any suitable type of transmitters and receivers. In one embodiment, the transmitter 210 and the receiver 212 may be part of a transceiver.

Figure 5:
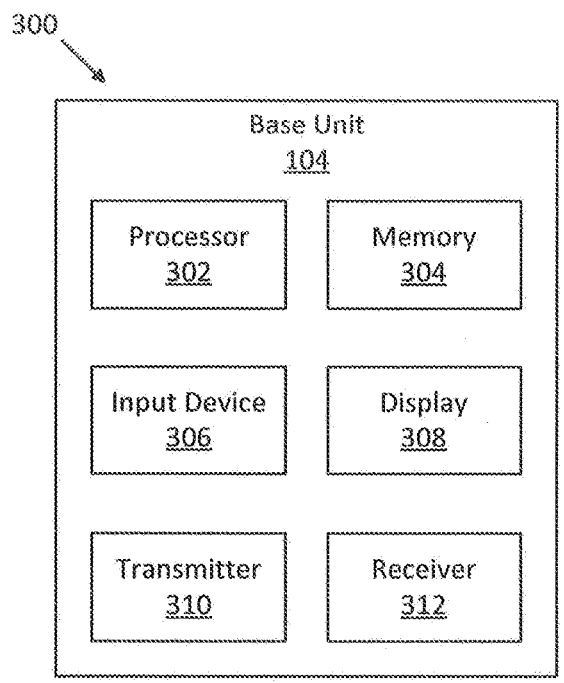
FIG. 5 is a schematic block diagram illustrating one embodiment of another apparatus that may be used for time domain resource allocation.

FIG. 5 depicts one embodiment of another apparatus 300 that may be used for time domain resource allocation. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 6:
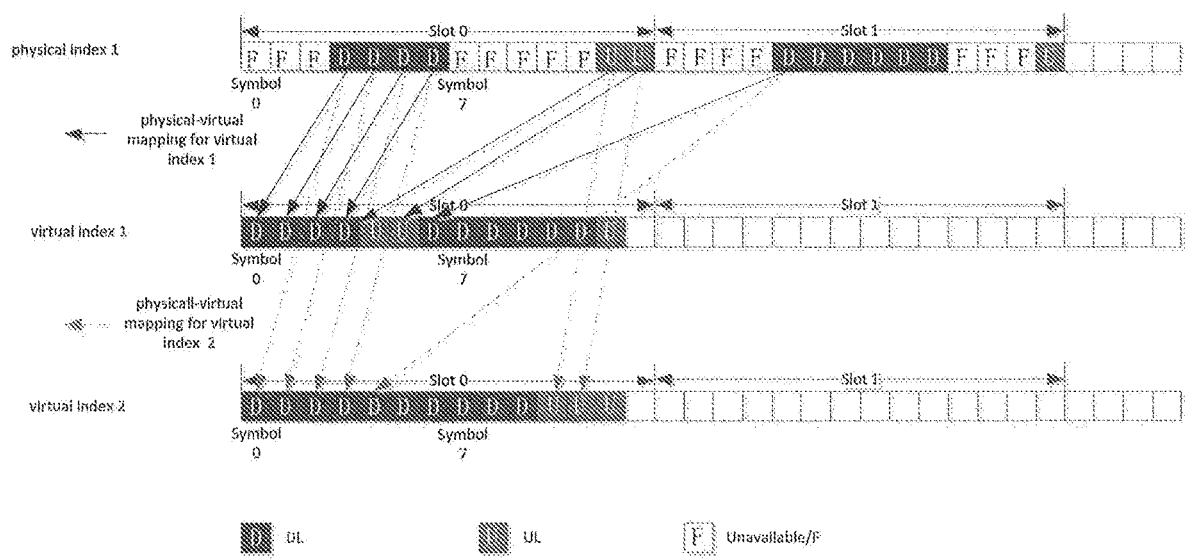
FIG. 6 is a schematic diagram illustrating aggregation of fragmented resources.

FIG. 6 shows an embodiment of aggregating fragmented resources. The physical index 1 sequence of slots depicted in FIG. 6 shows a slot format partitioning between a child node and a UE for DL transmission and UL reception as indicated by DCI format 2_0. For ease of discussion, FIG. 6 shows a slot format partitioning associated with only two slots (slot 0 and slot 1), wherein each slot includes 14 symbols (from symbol 0 to symbol 13). In FIG. 6, a starting position of the slot format is symbol 0 of slot 0, and the ending position of the slot format is symbol 13 of slot 1.

The slot format associated with the physical index 1 sequence of slots 0 and 1 of FIG. 6 is FFFDDDDFFFFFUU+FFFFDDDDDDFFFU, in which "F" represents a reserved symbol, i.e., symbols non-used for the access link between a child node and a UE (these symbols might be scheduled by a parent node to be used for the backhaul link between the parent node and the child node); "D" represents symbols for DL (downlink) transmission (e.g. on PDSCH) from the child node to the UE; and "U" represents symbols for UL (uplink) transmission (e.g. on PUSCH) from the UE to the child node. It thus can be seen that symbols 0-2 and 7-11 of slot 0 and symbols 0-3 and 10-12 of slot 1 are reserved symbols; symbols 3-6 of slot 0 and symbols 4-9 of slot 1 are symbols allocated for downlink transmission; and symbols 12-13 of slot 0 and symbol 13 of slot 1 are symbols allocated for uplink transmission.

It can be seen that symbols for downlink transmission, i.e., symbols 3-6 of slot 0 and symbols 4-9 of slot 1, are fragmented. Further, symbols for the uplink transmission, i.e., symbols 12-13 of slot 0 and symbol 13 of slot 1, are also fragmented.

Such fragmentation requires that each fragmented resource has to be scheduled by an individual PDCCH from the child node to the UE. Therefore, resources used to transmit information on symbols 3-6 of slot 0 and on symbols 4-9 of slot 1 have to be scheduled by the child node separately. This results in UE monitoring each of the scheduled resources on PDCCH from the child node, which is extremely inefficient in the condition when there are many fragmented resources to be used.

To overcome this inefficiency, fragmented resources may be mapped into a virtual format representing continuous time domain resources. FIG. 6 shows an embodiment of aggregating fragmented resources by mapping the fragmented resources into continuous resources.

First, the mapping boundary of the fragmented resources has to be determined. The mapping boundary may include a starting position and an ending position. In FIG. 6, the starting position is associated with symbol 0 of slot 0, and the ending position is associated with symbol 13 of slot 1.

The mapping boundary is not limited to that shown in FIG. 6. The mapping boundary, i.e., the starting position and the ending position, may be determined in different ways. In a first option (Option 1), the starting position and the ending position may be predetermined as being aligned with the physical slot boundary. The length from the starting position to the ending position may also be predetermined. For example, if the length is 10 slots, symbol 0 in slot 0, symbol 0 in slot 10, symbol 0 in slot 20, etc., may correspond to starting positions, respectively. Similarly, symbol 13 in slot 9, symbol 13 in slot 19, symbol 13 in slot 29, etc., may correspond to ending positions, respectively.

Alternatively, in a second option (Option 2), the starting position and the ending position may depend on monitoring occasion and periodicity of the DCI format 2_0.

In this second option, the slot boundary where DCI format 2_0 is detected may be determined as the starting position, and the ending position would be the starting position plus the periodicity for monitoring DCI format 2_0. For example, suppose that the DCI monitoring periodicity is 20 slots, slot offset is 1, and symbol position is 2. The DCI monitoring periodicity, slot offset and the symbol position indicate where the UE should start monitoring the DCI format 2_0 message. With periodicity being equal to 20 slots, a slot offset being set to 1 slot and a symbol position being set to 2 symbols, UE would expect to receive the first symbol of the DCI format 2_0 message on symbol 2 of slot 1, symbol 2 of slot 21, symbol 2 of slot 41, etc.

In this condition, the starting position and the ending position of the mapping may be determined on the basis of the monitoring periodicity, the slot offset and the symbol position. For example, the starting position may be determined as symbol 2 of slot 1, symbol 2 of slot 21, . . . , etc.; and the ending position may be determined as symbol 1 of slot 21, symbol 1 of slot 41, . . . , etc. Alternatively, the determination may only be made on the basis of the monitoring periodicity and the slot offset (i.e. the symbol position is not considered for simplicity). For example, in the above example, the starting position may be determined as symbol 0 of slot 1 (i.e. the first symbol of the slot where the DCI format 2_0 is monitored) and the ending position would be symbol 13 of slot 20.

A virtual index 1 sequence of slots depicted in the middle of FIG. 6 shows a first version of the virtual format representing continuous time domain resources. This first version of the virtual format is depicted by a continuous set of symbols: DDDDUUDDDDDDU, which is obtained by excluding reserved resources and concatenating symbols used for downlink and uplink transmission. The slot format indicated in DCI format 20 may be referred to as a physical format. In particular, symbols 3-6 of slot 0 of the physical format are mapped to symbols 0-3 of slot 0 of the virtual format; symbols 12-13 of slot 0 of the physical format are mapped to symbols 4-5 of slot 0 of the virtual format; symbols 4-9 of slot 1 of the physical format are mapped to symbols 6-11 of slot 0 of the virtual format; and symbol 13 of slot 1 of the physical format is mapped to symbol 12 of slot 0 of the virtual format. Therefore, fragmented symbols are aggregated into continuous set of symbols.

Finally, a virtual index 2 sequence of slots depicted in the lower part of FIG. 6 shows another virtual format representing continuous time domain resources. This second version of the virtual format is identified by a continuous set of symbols: DDDDDDDDDDDUUU, which is also obtained by excluding the reserved resources and concatenating symbols used for downlink and uplink transmission. This second version of the virtual format differs from the first version in that all of symbols used for downlink transmission are grouped first prior to being concatenated with the uplink transmission symbols. In particular, symbols 3-6 of slot 0 of the physical format are mapped to symbols 0-3 of slot 0 of the second virtual format; symbols 4-9 of slot 1 of the physical format are mapped to symbols 4-9 of slot 0 of the second virtual format; symbols 12-13 of slot 0 of the physical format are mapped to symbols 10-11 of slot 0 of the second virtual format; and symbol 13 of slot 1 of the physical format is mapped to symbol 12 of slot 0 of the second virtual format.

Figure 7:
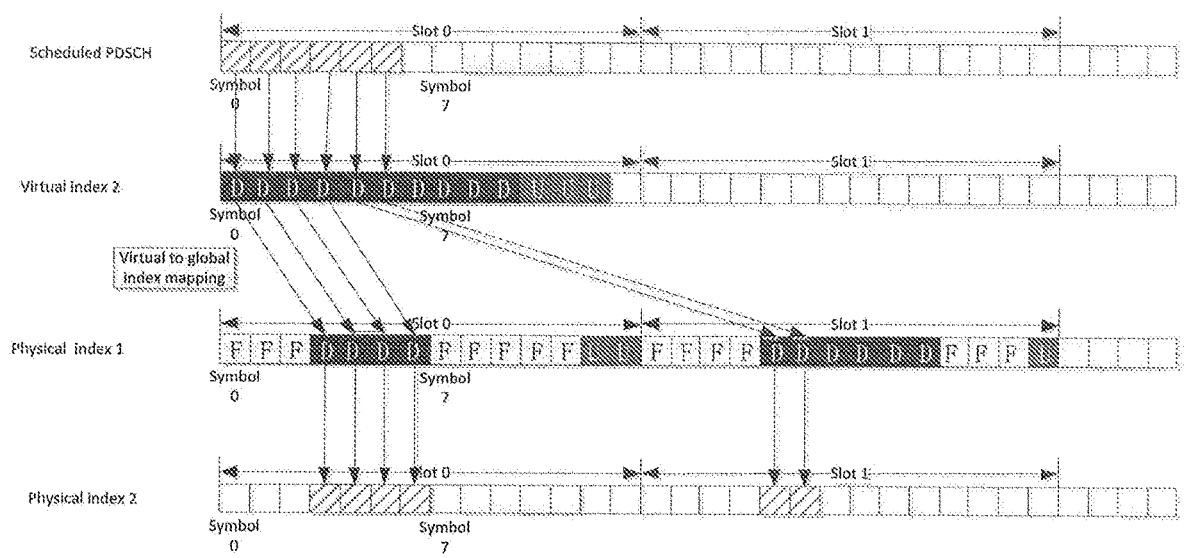
FIG. 7 is a schematic diagram illustrating reverse mapping.

FIG. 7 describes a reverse mapping from the virtual format to the physical slot format indicated in DCI format 2_0.

Suppose that the child node schedules six symbols for downlink transmission, e.g. symbols 0-5 identified in slot 0 of a virtual format time domain resource, as shown in the Scheduled PDSCH sequence of slots in FIG. 7. For UE to successfully receive these virtual symbols, it has to know which physical time domain resource(s) were used to transmit them, i.e. what physical slot format was used.

To correctly identify physical time domain resource used, UE makes reverse mapping with respect to the mapping shown in FIG. 6. For example, taking the second version of the virtual format mapping example, described by the physical index 1 and the virtual index 2 slot sequences of FIG. 6, the UE must now reverse the mapping of symbols 3-6 of slot 0 of the physical format to symbols 0-3 of slot 0 of the virtual format; of symbols 4-9 of slot 1 of the physical format to symbols 4-9 of slot 0 of the virtual format; of symbols 12-13 of slot 0 of the physical format to symbols 10-11 of slot 0 of the virtual format; and of symbol 13 of slot 1 of the physical format to symbol 12 of slot 0 of the virtual format.

The virtual index 2 and physical index 1 slot sequences of FIG. 7 illustrate such reverse mapping, between the virtual format and a physical format, respectively, where symbols 0-3 of a virtual format slot 0 associated with virtual index 2 sequence of slots are mapped to symbols 3-6 of the physical format slot 0; symbols 4-9 of the virtual format slot 0 are mapped to symbols 4-9 of the physical format slot 1; symbols 10-11 of the virtual format slot 0 are mapped to symbols 12-13 of the physical format slot 0; and symbol 12 of the virtual format slot 0 is mapped to symbol 13 of the physical format slot 1.

According to such reverse mapping, a UE or a child node, when it acts as the UE, will be able to determine that the scheduled symbols 0-5 of the virtual format slot 0 will actually be transmitted on the downlink as symbols 3-6 of slot 0 and symbols 4-5 of slot 1 of the physical format.

Figure 8:
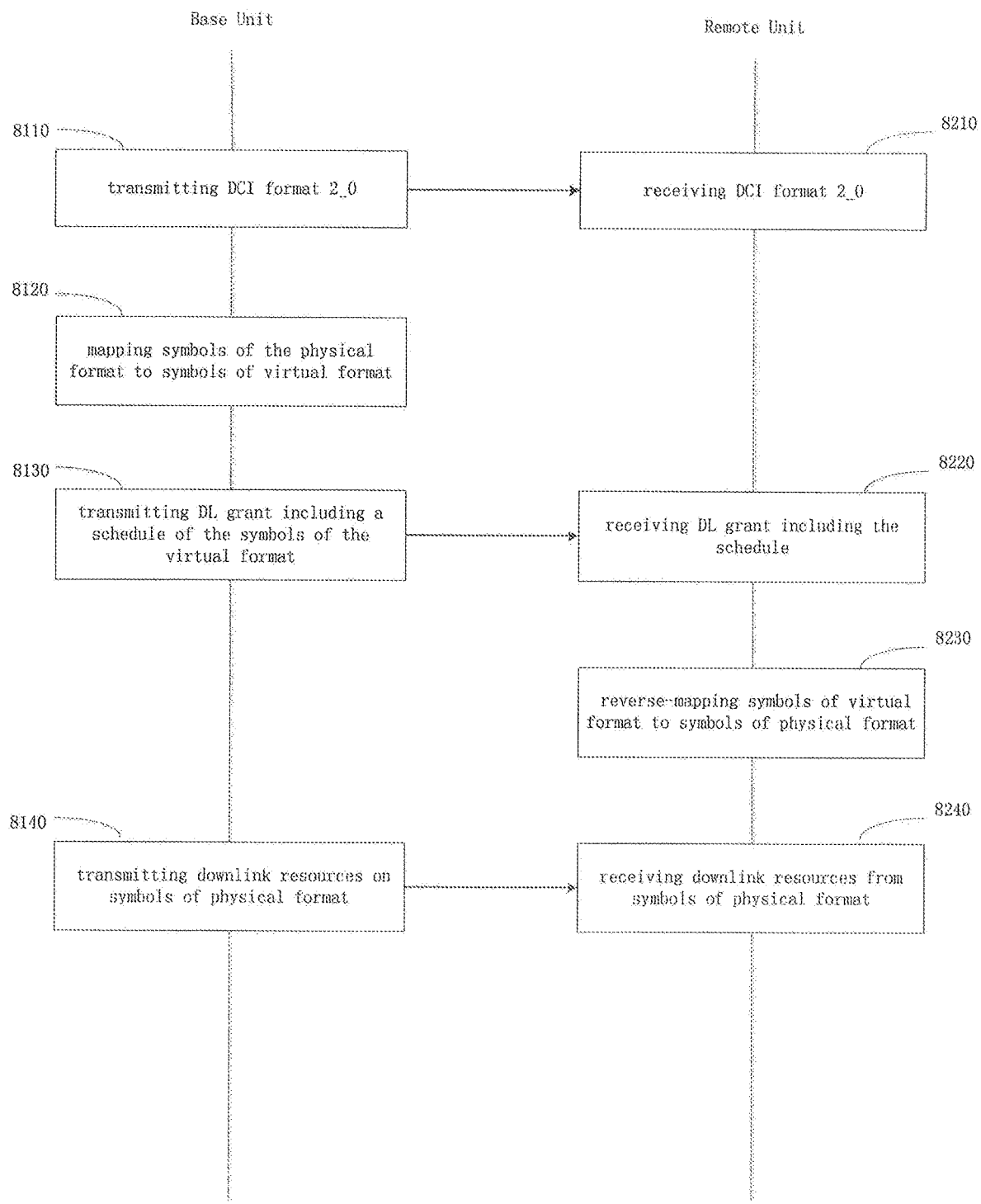
FIG. 8 is a flow chart diagram illustrating a method of time domain resource allocation according to a first embodiment.

In FIG. 8, the child node is indicated as a base unit, and the UE is indicated as a remote unit. FIG. 8 illustrates the schematic diagram of the methods performed in the base unit and in the remote unit according to the first embodiment.

In step 8110, the base unit transmits DCI format 2_0 to the remote unit indicating a physical slot format associated with transmitted symbols. For example, the physical slot format indicated in the DCI format 2_0 may be a physical format shown in the physical index 1 slot sequence of FIG. 6. In step 8210, the remote unit receives the DCI format 2_0.

The periodicity of transmitting the DCI format 20 is predetermined. Each time the DCI format 2_0 is transmitted, the physical format of symbols indicated in the DCI format 2_0 may be changed. Symbols allocated for downlink transmission of the access link, symbols allocated for uplink transmission of the access link and reserved symbols may be changed. Therefore, each time the remote unit receives a new DCI format 2_0, the physical format indicated may differ. As a consequence, mapping between a virtual format and a physical format may accordingly be changed.

In step 8120, the base unit maps the symbols of the physical format to the symbols of the virtual format. In particular, according to the mapping boundary described in Option 1 and the first version of the virtual format mapping between the physical index 1 slot sequence of FIG. 6 and the Virtual index 1 slot sequence, or according to the mapping boundary of Option 1 and the second version of the virtual format mapping between the physical index 1 slot sequence of FIG. 6 and the Virtual index 2, the base unit performs physical to virtual time domain resource mapping. For example, in the condition that downlink resources are to be transmitted and the second version of the virtual format is adopted (and with the mapping boundary of the Option 1), symbols transmitted on physical downlink time domain resources shown in the Physical index 2 slot sequence of FIG. 7 would be mapped to the symbols for the virtual time domain resource shown in the Scheduled PDSCH slot sequence of FIG. 7.

In step 8130, the base unit transmits a DL grant to initiate a PDSCH transmission. Alternatively, if a UL grant is transmitted, a PUSCH transmission is initiated. The DL grant includes a schedule of symbols according to a virtual format. In step 8220, the remote unit receives the DL grant including the schedule. The DL grant provides the remote unit with necessary information to prepare for the DL transmission.

Upon receiving DL grant including a schedule, remote unit, in step 8230, calculates the actual symbols for receiving the downlink resources by reverse-mapping the symbols identified in the virtual format received in the scheduling information to the symbols of the physical format. For example, as shown in FIG. 7, the UE receives a schedule for PDSCH shown in the scheduled PDSCH of FIG. 7, and according to the predetermined reverse mapping rule and the physical format received on step 8210, reverse-maps the symbols shown in the scheduled PDSCH of FIG. 7 to the symbols shown in the physical index 2 of FIG. 7.

In step 8140, the base unit transmits symbols on physical time domain resources (PDSCH), e.g. symbols shown in the physical index 2 sequence of slots of FIG. 7. In step 8240, the remote unit receives such symbols of the physical format, e.g. the symbols shown in the physical index 2 of FIG. 7.

According to the methods described with reference to FIG. 8, the remote unit reverse-maps the virtual format to the physical format based on the received DCI format 2_0 for a set of time domain resources. Once a new DCI format 2_0 is received at step 8210, the remote unit would update the mapping based on the new DCI format 2_0. Upon receiving the DL grant including the schedule of symbols of the virtual format at step 8220, the remote unit automatically calculate the actual symbols (e.g. the physical index 2 in FIG. 7) for reception based on the newly received DCI format 2_0, which is a subset of the set of time domain resources based on the scheduling information. Therefore, the remote unit always knows the actual symbols expected to be received.

According to the first embodiment, the fragmented resources to be used may be aggregated to be scheduled together with a single PDCCH. Therefore, the overhead for scheduling at the base unit and the detection effort at the remote unit would be greatly reduced.

The first embodiment is described with reference to PDSCH. Similarly, the first embodiment also applies to the PUSCH.

Since the time domain resource configuration of the control channel is semi-statically configured, there might be a mismatch between preconfigured control channel (PDCCH and PUCCH) time domain resource configurations and the slot format indicated by DCI format 2_0, since the DCI format 2_0 changes more frequently than control channel time domain resource configuration.

Figure 9:
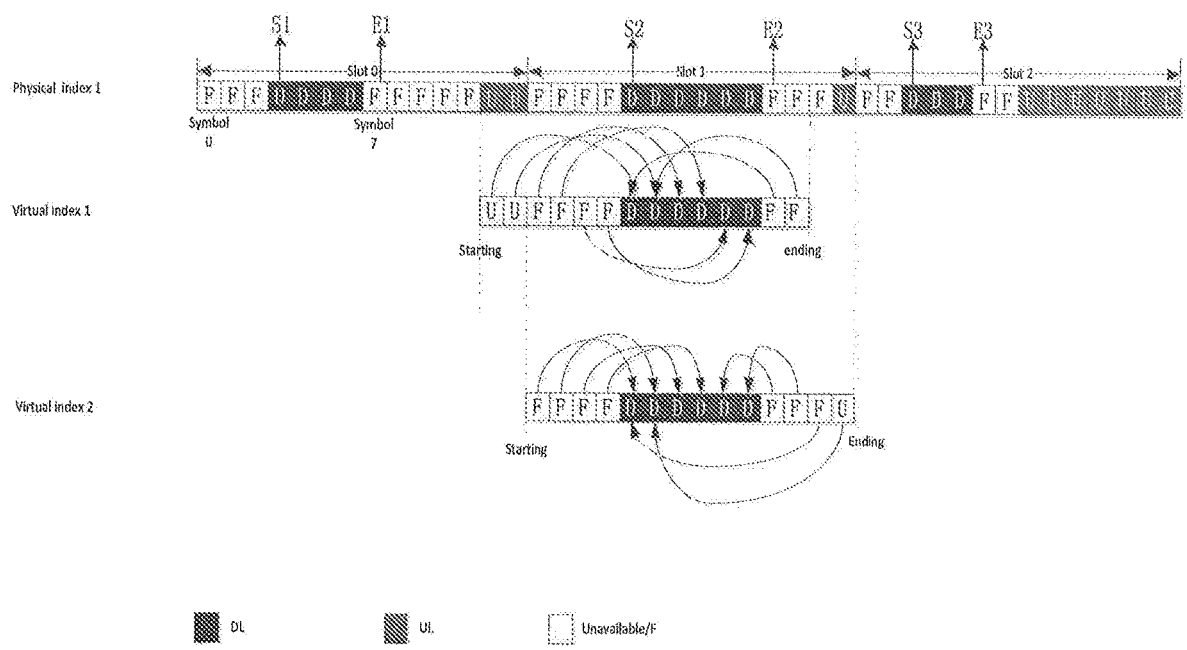
FIG. 9 is a schematic diagram illustrating circular mapping of unavailable symbols to available symbols.

FIG. 9 shows an embodiment of circular mapping of unavailable symbols to available symbols. The upper physical index 1 slot sequence of FIG. 9 shows the slot format used between a child node and an UE for DL and UL transmissions as indicated by DCI format 2_0. For ease of discussion, FIG. 9 shows the slot format that only contains three slots (slot 0, slot 1 and slot 2), wherein each slot includes 14 symbols (from symbol 0 to symbol 13).

The slot format depicted in the physical index 1 slot sequence of FIG. 9 is FFFDDDDFFFFFUU+ FFFFDDDDDDFFFU+FFDDDFFUUUUUUUU for slots 0-2, in which "F" represents a reserved symbol, i.e., symbol that are not-used for the access link between the child node and the UE (that might be scheduled by a parent node to be used for the backhaul link between the parent node and the child node); "D" represents a symbol for DL (downlink) transmission (e.g., PDCCH) from the child node to the UE; and "U" represents symbol for UL (uplink) transmission (e.g., PUCCH) from the UE to the child node. It thus can be seen that symbols 0-2 and 7-11 of slot 0, symbols 0-3 and 10-12 of slot 1 and symbols 0-1 and 5-6 of slot 2 are reserved symbols; symbols 3-6 of slot 0, symbols 4-9 of slot 1 and symbols 2-4 of slot 2 are symbols for downlink transmission; and symbols 12-13 of slot 0, symbol 13 of slot 1 and symbols 7-13 of slot 2 are symbols for uplink transmission.

It can be seen that the symbols for downlink transmission are only symbols 3-6 of slot 0, symbols 4-9 of slot 1 and symbols 2-4 of slot 2. In other words, the downlink transmission (PDCCH) can be made only in symbols 3-6 of slot 0, symbols 4-9 of slot 1 and symbols 2-4 of slot 2. Since the time domain resource configuration for PDCCH may be semi-statically configured by RRC signaling, for example, the resource for PDCCH (e.g. physical index 1 in FIG. 9) may be pre-configured by RRC signaling on symbols 0-1 of slot 1, while the slot format transmitted in DCI 2_0, on the other hand, can be changed a lot more frequently. In the condition that the DCI format 2_0 is set (changed) to the slot format shown in the physical index 1 slot sequence of FIG. 7, symbols 0-1 of slot 1 will now belong to a reserved symbols set, i.e., symbols that cannot be used for the access link between the child node and the UE. In this condition, it is impossible to transmit PDCCH in the symbols 0-1 of slot 1 for the access link between the child node and the UE.

To solve this mismatch between the preconfigured PDCCH (as well as PUCCH) resources and the slot format indicated by DCI format 2_0, FIG. 9 shows an embodiment of mapping of the unavailable symbols for transmission to available symbols performed at both the base unit and the remote unit side.

First, to begin the mapping process, mapping duration (or boundary) is determined. The mapping duration is a duration when the mapping between the physical resource and virtual resource is performed. It always has a starting boundary and an ending boundary. Same mapping principle or options will be adopted in the mapping duration. Suppose a first consecutive DL transmission starts at S1 (which means that the first symbol for DL transmission is S1), and ends at E1 (which means that the last symbol for DL transmission is E1-1), a second consecutive DL transmission which immediately follows the first consecutive DL transmission starts at S2, and ends at E2, and a third consecutive DL transmission which immediately follows the second consecutive DL transmission starts at S3, and ends at E3. As shown in FIG. 9, S1 is 3, E1 is 7, S2 is 4, E2 is 10, S3 is 2, and E3 is 5.

There are different options for determining the duration of the mapping. In the first option, the starting position of the duration is determined as the middle symbol between ending of a previous consecutive DL (i.e. E1) and starting of the current consecutive DL (i.e. S2). For example, the middle symbol may be calculated by an equation "floor ((E1+S2+14×k)/2), wherein k equals slot number of S2 minus slot number of E1". If the result is between 0 and 13, the starting position will be the symbol number of the result with the slot number of E1; and if the result is between 14 and 27, the starting position will be the symbol number of "the result minus 14" with the slot number of E1 plus 1; and if the result is between 28 and 41, the starting position will be the symbol number of "the result minus 28" with the slot number of E1 plus 2; and so on. The ending position of the duration is determined as the middle symbol between ending of the current consecutive DL (e.g. E2) and starting of a next consecutive DL (e.g. S3). For example, the middle symbol may be calculated by an equation "floor ((E2+S3+14×k)/2), wherein k equals slot number of S3 minus slot number of E2". If the result is between 0 and 13, the starting position will be the symbol number of the result with the slot number of E2; and if the result is between 14 and 27, the starting position will be the symbol number of "the result minus 14" with the slot number of E2 plus 1; and if the result is between 28 and 41, the starting position will be the symbol number of "the result minus 28" with the slot number of E2 plus 2; and so on.

In the example of FIG. 9, E1 is 7; S2 is 4; slot number of S2 is 1; and slot number of E1 is 0. Accordingly, the result is floor ((7+4+14)×(1−0))/2)=12. Therefore, the starting position of the duration is symbol 12 of slot 0. Similarly, in the example of FIG. 9, E2 is 9; S3 is 2; slot number of S3 is 2; and slot number of E2 is 1. Accordingly, the result is floor ((9+2+14×(2−1))/2)=12. Therefore, the ending position of the duration is symbol 12 of slot 1.

As shown in the middle part of virtual index 1 slot of FIG. 9, the duration of the mapping is from symbol 12 of slot 0 to symbol 12 of slot 1, which means that the mapping is performed on symbols 12-13 of slot 0 and symbols 0-11 of slot 1.

In a second option for determining the mapping duration, the starting position of a duration may be a predefined position between the end of a previous set of consecutive DL symbols (for example E1) and a starting position of the current set of consecutive DL symbols (for example S2). For example, for this second option, a slot boundary may correspond to such predefined position. If there are more than one slot boundary between ending position of a previous consecutive set of DL symbols and a starting position of the current consecutive set of DL symbols, the first or the last slot boundary may be determined as a predefined position. The ending position of a duration may also be a predefined position between the ending position of the current consecutive set of DL symbols (for example E2) and the starting position of the next consecutive set of DL symbols (for example S3). For example, the slot boundary may be a predefined position. If there are more than one slot boundary between ending of the current consecutive DL and starting of the next consecutive DL, the first or last slot boundary may be determined as the predefined position.

As shown in virtual index 2 slot of FIG. 9, the boundary of the mapping is from symbol 0 of slot 1 to symbol 0 of slot 2, which means that the mapping is performed on symbols 0-13 of slot 1.

After determining the mapping boundaries (e.g. the start and the end positions), symbols located within such boundary (including the unavailable symbols and the available symbols) are mapped to the available symbols. In example of a PDCCH, the available symbols include those symbols that are indicated by the DCI format 2_0 as downlink symbols, for example, all of symbols indicated as "D" in the physical index 1 sequence of slot of FIG. 9, e.g. symbols 3-6 of slot 0, symbols 4-9 of slot 1 and symbols 2-4 of slot 2; while the unavailable symbols include those symbols that are indicated by the DCI format 2_0 as reserved symbols or uplink symbols, for example, all of symbols indicated as "F" and "U" in the physical index 1 of FIG. 9.

The arrows in FIG. 9 show the mapping. First, the available symbols are mapped to themselves. The available symbols 4-9 of slot 1 are mapped to themselves, i.e. symbols 4-9 of slot 1, in both the first option (the virtual index 1 of FIG. 9) and the second option (the virtual index 2 of FIG. 9). The mapping of the available symbols is not explicitly shown with arrows in FIG. 9.

Then, the unavailable symbols are mapped to the available symbols in a circular manner. In the first option shown in the virtual index 1 of FIG. 9, symbols 12 and 13 of slot 0 are mapped to symbols 4 and 5 of slot 1 (e.g. the first two symbols among the available symbols), symbols 0-3 of slot 1 are mapped to symbols 6-9 of slot 1 (e.g. the remaining four symbols among the available symbols), and symbols 10 and 11 of slot 1 are mapped to symbols 4 and 5 of slot 1 (as all of six available symbols have been mapped, the first two available symbols are circularly mapped for the second time).

In the second option shown in the virtual index 2 of FIG. 9, symbols 0-3 of slot 1 are mapped to symbols 4-7 of slot 1, symbols 10-11 of slot 1 are mapped to symbols 8-9 of slot 1, and symbols 12-13 of slot 1 are mapped to symbols 4-5 of slot 1.

Figure 10:
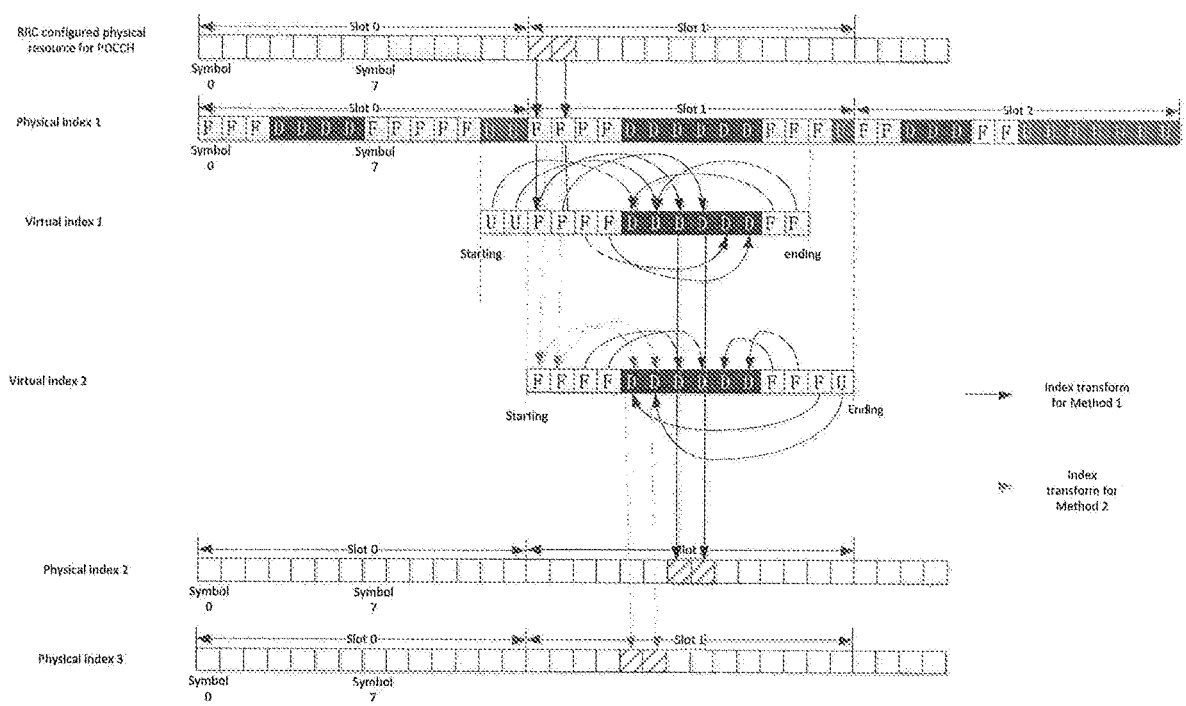
FIG. 10 is a schematic diagram illustrating a detailed circular mapping of the unavailable symbols.

FIG. 10 shows a detailed mapping. Suppose that the RRC configured PDCCH would be transmitted in symbols 0 and 1 of slot 1. However, according to the DCI format 2_0, the symbols 0 and 1 of slot 1 are unavailable. Therefore, the child node would, based on the mapping rule described with reference to FIG. 9, map the symbols 0 and 1 of slot 1 to available symbols that can be used for PDCCH of the access link.

According to the first option of mapping, with reference to the physical index 1 and virtual index 1 of FIG. 10, symbols 0 and 1 of slot 1 are mapped to symbols 6 and 7 of slot 1. Therefore, as shown in the physical index 2 of FIG. 10, the PDCCH would be transmitted in symbols 6 and 7 of slot 1.

According to the second option of mapping, with reference to the physical index 1 and virtual index 2 of FIG. 10, symbols 0 and 1 of slot 1 are mapped to symbols 4 and 5 of slot 1. Therefore, as shown in the physical index 3 of FIG. 10, the PDCCH would be transmitted in symbols 4 and 5 of slot 1.

According to such mapping, the PDCCH can now be transmitted in available symbols.

As the number of available symbols for transmission is determined according to DC format 2_0, while the PDCCH is scheduled by RRC signaling configuration, there could be a situation in which there are more symbols configured by RRC signaling for transmitting on PDCCH than the available symbols. In such situation, more than one symbol configured for transmitting PDCCH would be mapped to the same available symbol. For example, in the first option shown in the virtual index 1 of FIG. 9, symbol 12 of slot 0 and symbol 10 of slot 1 are both mapped to symbol 4 of slot 1. In addition, symbol 4 of slot 1 is also mapped to itself, i.e. symbol 4 of slot 1. For ease of discussion, symbol 12 of slot 0 and symbol 10 of slot 1 are referred to as being redirected, while symbol 4 of slot 1 is referred to as without being redirected.

In the condition that more than one symbol is mapped to the same available symbol, the symbol without being redirected has higher priority than the symbol being redirected. In addition, for the symbol 12 of slot 0 and the symbol 10 of slot 1, both of which are being redirected, the symbol 12 of slot 0 has higher priority because it is before symbol 10 of slot 1 in timing. As a whole, the symbol with the highest priority would be transmitted. The symbol(s) with lower priority(ies) would be dropped.

Figure 11:
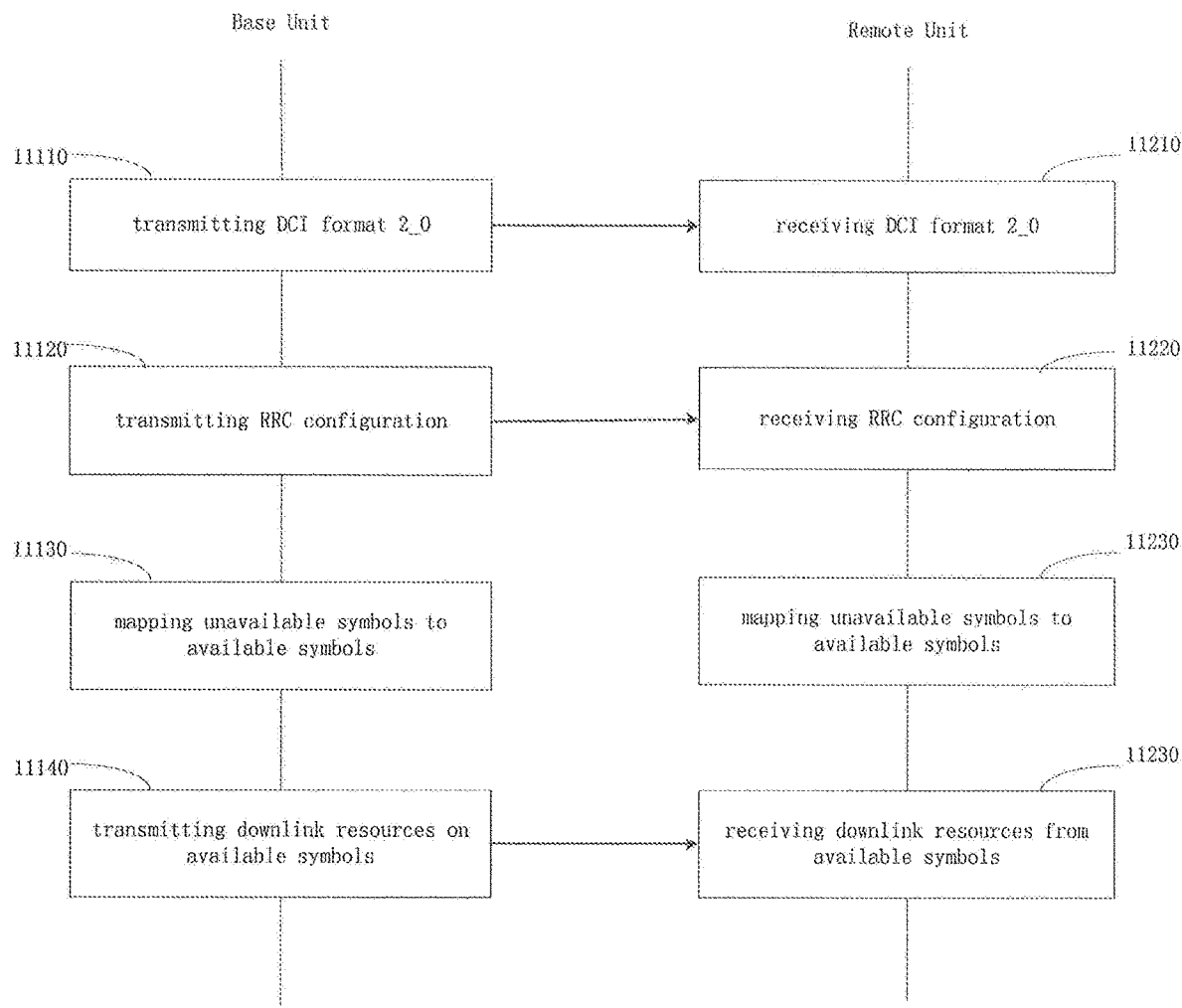
FIG. 11 is a flow chart diagram illustrating a method of time domain resource allocation according to a second embodiment.

In FIG. 11, the child node is indicated as a base unit, and the UE is indicated as a remote unit. FIG. 11 illustrates the schematic diagram of the methods performed in the base unit and in the remote unit according to the second embodiment.

In step 11110, the base unit transmits DCI format 2_0 indicating the physical format of the symbols. In step 11210, the UE receives the DCI format 2_0. The physical format indicated in the DCI format 2_0 may be the physical format shown in the physical index 1 of FIG. 9.

The periodicity of transmitting the DCI format 2_0 is predetermined. Each time the DCI format 2_0 is transmitted, the physical format of the symbols indicated in the DCI format 2_0 may change. In particular, the symbols assigned for a downlink transmission on the access link, the symbols assigned for an uplink transmission of the access link and the reserved symbols may change. Therefore, each time the remote unit receives a changed DCI format 2_0, the physical format associated with time domain resources may differ. Hence, the detailed mapping between the virtual format and the physical format may accordingly be changed.

In step 11120, the base unit transmits the RRC configuration of PDCCH. Alternatively, if a PUCCH transmission is necessary, the base unit transmits the RRC configuration for PUCCH. In step 11220, the remote unit receives such RRC configuration. For example, as shown in the RRC configured physical resource for PDCCH of FIG. 10, the RRC configured PDCCH would be transmitted in symbols 0 and 1 of slot 1.

In FIG. 1I, step 11120, RRC configuration is transmitted after step 11110, in which the DCI format 2_0 is transmitted. However, the transmission of the RRC configuration may be performed before the transmission of the DCI format 2_0, which means that step 11120 may be performed before step 11110. As described earlier, the DCI format 2_0 changes more frequently than RRC configuration. Therefore, after the transmission of the RRC configuration, the DCI format 2_0 may be transmitted more than once before the transmission of another RRC configuration. As a result, the order and times associated with performing steps 11110 and 11120 are not limited to the order and times identified in FIG. 11. The point is: when the determination of the physical symbols to be used for transmitting PDCCH is made (see the following step 11130), the physical symbols would be identified using the last (or most recently) transmitted DCI format 2_0.

In step 11130, the base unit determines the physical symbols to be used for transmitting PDCCH. As shown in FIG. 10, if the first option of mapping is adopted, the PDCCH would be transmitted on symbols 6 and 7 of slot 1 (see the virtual index 1 and the physical index 2 of FIG. 10); and if the second option of mapping is adopted, the PDCCH would be transmitted on symbols 4 and 5 of slot 1 (see the virtual index 2 and the physical index 3 of FIG. 10).

In step 11230, the remote unit performs the same mapping as the base unit so that the remote unit knows on which physical symbol(s) PDCCH would be transmitted.

In step 11140, the base unit transmits PDCCH on the available symbol(s) mapped to in step 11130. In step 11240, the remote unit receives the PDCCH on the available symbol(s) identified as a result of mapping performed in step 11230. Incidentally, as described above, in the condition that the available mapped symbol(s) in step 11130 would be used by other symbols due to their higher priority, the PDCCH that is redirected and has lower priority would be dropped and not transmitted in step 11140.

According to the methods described with reference to FIG. 11, the base unit maps the symbols unavailable for transmitting PDCCH to available symbols according to the physical format indicated in the last received DCI format 2_0. The remote unit, upon receiving RRC configured PDCCH, performs the same mapping as the base unit so that it knows where the PDCCH would actually be transmitted. Therefore, even if a mismatch between the preconfigured PDCCH monitoring occasion and the slot format indicated by DCI format 2_0 occurs, the UE may successfully receive the PDCCH. This kind of behavior can be enabled by RRC signaling of the base unit. Once enabled, the mapping between physical resources to virtual resource will be performed at both the base unit side and the remote unit side; otherwise, no mapping will be performed.

The second embodiment is described with reference to PDCCH. Similarly, the second embodiment also applies to the PUCCH. In case of PUCCH, the available symbols include those symbols that are indicated by the DCI format 2.0 as uplink symbols while the unavailable symbols include those symbols that are indicated by the DCI format 2_0 as reserved symbols and downlink symbols.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
receiving a first slot format indicating a first time domain resource;
receiving an indicator indicating a second time domain resource allocated for data or control channel transmission, wherein the second time domain resource is a virtual time domain resource, and wherein the indicator indicating the second time domain resource for the data or control channel transmission is a second slot format different from the first slot format and the second slot format comprises consecutive downlink symbols and uplink symbols without reserved symbols intervened;

mapping the second time domain resource to a third time domain resource, wherein the third time domain resource is a subset of the first time domain resource, and the third time domain resource is a physical time domain resource; and receiving the data or control channel transmission from the third time domain resource.

2. The method of claim 1, further comprising:
determining a mapping boundary for mapping.

3. The method of claim 2, wherein the mapping boundary includes a starting position and an ending position, and the starting position and the ending position are aligned with a physical slot boundary, respectively.

4. The method of claim 2, wherein the mapping boundary includes a starting position and an ending position, and the starting position and the ending position are determined based on a monitoring occasion and periodicity for receiving the first slot format.

5. The method of claim 2, wherein the mapping boundary includes a starting position and an ending position, and the starting position and the ending position are determined based on starting and ending of consecutive available time domain resources.

6. The method of claim 1, wherein the second slot format comprises a virtual format.

7. The method of claim 1, wherein the downlink symbols and the uplink symbols are interlaced.

8. The method of claim 1, wherein the downlink symbols and the uplink symbols are continuous, respectively.

9. The method of claim 1, wherein, in the first slot format, downlink symbols and uplink symbols are non-consecutive, respectively, and the mapping comprises mapping the consecutive symbols in the second slot format to the non-consecutive symbols in the first slot format.

10. The method of claim 9, wherein the first slot format further includes reserved symbols.

11. The method of claim 1, wherein the first slot format includes unavailable symbols and available symbols for control channel transmission, and the mapping comprises mapping the unavailable symbols to the available symbols circularly.

12. The method of claim 1, wherein the indicator is received before the first slot format is received.

13. A method performed by a base station, the method comprising:
transmitting a first slot format indicating a first time domain resource;
mapping a third time domain resource for data channel transmission to a second time domain resource, wherein the third time domain resource is a subset of the first time domain resource, the second time domain resource is a virtual time domain resource, and the third time domain resource is a physical time domain resource;
transmitting an indicator indicating the second time domain resource, wherein the indicator indicating the second time domain resource is a second slot format different from the first slot format and the second slot format comprises consecutive downlink symbols and uplink symbols without reserved symbols intervened; and
transmitting the data channel on the third time domain resource.

14. The method of claim 13, further comprising:
determining a mapping boundary for mapping.

15. The method of claim 14, wherein the mapping boundary includes a starting position and an ending position, and the starting position and the ending position are aligned with a physical slot boundary, respectively.

16. The method of claim 14, wherein the mapping boundary includes a starting position and an ending position, and the starting position and the ending position are determined based on a transmitting occasion and periodicity for transmitting the first slot format.

17. A method performed by a base station, the method comprising:
transmitting a first slot format indicating a first time domain resource;
transmitting an indicator indicating a second time domain resource allocated for control channel transmission, wherein the indicator indicating the second time domain resource for the control channel transmission is a second slot format different from the first slot format and the second slot format comprises consecutive downlink symbols and uplink symbols without reserved symbols intervened;
mapping the second time domain resource to a third time domain resource, wherein the third time domain resource is a subset of the first time domain resource, the second time domain resource is a virtual time domain resource, and the third time domain resource is a physical time domain resource; and
transmitting the control channel transmission on the third time domain resource.

18. The method of claim 17, further comprising:
determining a mapping boundary for mapping.

19. The method of claim 18, wherein the mapping boundary includes a starting position and an ending position, and the starting position and the ending position are aligned with a physical slot boundary, respectively.

20. A user equipment (UE), comprising:
at least one memory; and
at least one processor coupled with the at least one memory and configured to cause the UE to:
receive a first slot format indicating a first time domain resource;
receive an indicator indicating a second time domain resource allocated for data or control channel transmission, wherein the second time domain resource is a virtual time domain resource, and wherein the indicator indicating the second time domain resource for the data or control channel transmission is a second slot format different from the first slot format and the second slot format comprises consecutive downlink symbols and uplink symbols without reserved symbols intervened;
map the second time domain resource to a third time domain resource, wherein the third time domain resource is a subset of the first time domain resource, and the third time domain resource is a physical time domain resource; and
receive the data or control channel transmission from the third time domain resource.

* * * * *